Aug. 28, 1956 D. W. FISHER 2,761,025
TROLLEY POLE HEAD
Filed April 19, 1951
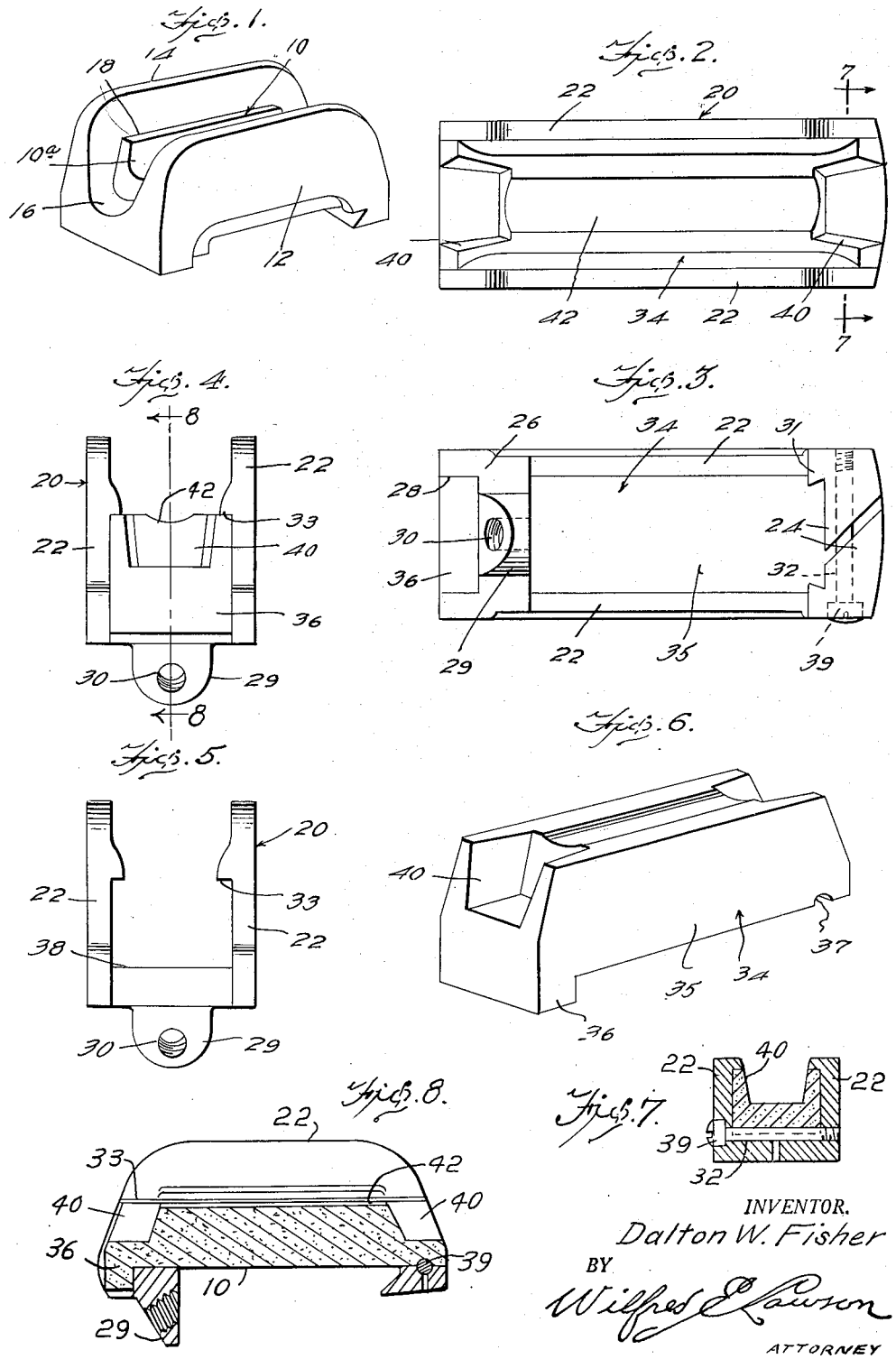
INVENTOR.
Dalton W. Fisher
BY
Wilfred E. Lawson
ATTORNEY

United States Patent Office 2,761,025
Patented Aug. 28, 1956

2,761,025

TROLLEY POLE HEAD

Dalton W. Fisher, Regina, Saskatchewan, Canada, assignor to The Ohio Brass Company, Mansfield, Ohio Application April 19, 1951, Serial No. 221,760

1 Claim. (Cl. 191—59.1)

This invention relates to improvements in electric current pick up devices for use on electric streetcars and trains and is directed particularly to an improved trolley pole shoe and carbon insert structure.

In present trolley car or trolley coach operation, frost, wet and icy conditions cause a very bad flash on the trailing end of the contact carbon insert which is carried by the trolley pole and which runs along the trolley wire, thus causing the carbon insert holder or shoe to be badly burned, as a result of which the shoe has to be removed, welded, ground, drilled, redrilled, rethreaded and countersunk for the head and a new bolt installed and in bad weather conditions this replacing of the holder or shoe is sometimes needed every few hours, thereby causing considerable expense.

The present invention has for a primary object to provide a novel contact carbon insert and insert holder or shoe which is so designed as to confine the electric arc on the trailing end of the insert in a manner to prevent it from burning the insert holder or shoe.

Another object of the invention is to provide a device of the character stated wherein the carbon insert can be readily slipped into position in the shoe and securely held by the employment of a single screw member disposed transversely of the shoe, thereby making the insertion and removal of the carbon insert a matter of a few minutes work.

Another object of the invention is to provide in a device of the character stated, a carbon insert which is formed at one end with a downturned lip which functions as a means for limiting the longitudinal extension of the insert into the holder or shoe, the opposite end of the insert being slotted to receive a portion of a transversely extended screw which is secured in the holder, thereby making it necessary to use only the single screw for firmly locking the insert in the holder.

Still another object of the invention is to provide an improved carbon insert for a device of the character stated, wherein each end of the insert is provided with a recess which is at a lower plane than the channel in which the trolley wire slides, which recess receives the sparks resulting from arcing and burning of the carbon and the wire where the device is used in bad weather as above set forth, thus effectively shielding or protecting the metal shoe from damage by burning by the flash or arc.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in perspective of a trolley pole shoe of a type now in use.

Figure 2 is a view in top plan of a shoe and carbon insert embodying the invention.

Figure 3 is a view in bottom plan of Figure 2.

Figure 4 is an end elevational view.

Figure 5 is a view similar to Figure 4 with the insert omitted.

Figure 6 is a perspective view of the insert as herein comprised.

Figure 7 is a sectional view taken substantially on the line 7—7 of Figure 2.

Figure 8 is a vertical sectional view taken in the direction 8—8 in Figure 4.

Referring now more particularly to the drawing reference will first be made to Figure 1 wherein there is illustrated in perspective a carbon and carbon insert holder or shoe of the type at present in use. In this view the carbon insert is designated 10 and the body of the shoe is designated 12. As shown the shoe is a one-piece metal body having a longitudinal channel defined by the side walls 14 and at the ends the channel bottom is defined by the concave end surfaces 16 between which the carbon insert 10 lies, the inner faces of the side walls 14 being suitably recessed at 18 to receive the carbon insert. As a result of this construction, when the shoe is in use in bad weather, when ice, snow or frost collects upon the trolley wire which slides in the longitudinal channel 10a of the carbon insert, arcing occurs, particularly on the trailing end of the shoe, which results in the bad burning of the metal of the shoe particularly in the end bottom surfaces 16. This burning is sometimes so bad as to completely destroy the end of the shoe making it necessary that the shoe be taken off and entirely replaced or rebuilt.

In accordance with the present invention there is provided a metal carbon insert holder or shoe which is generally designated 20 and which is in the form of a long casting body having the spaced parallel side walls 22, at one end of which are the inwardly extending opposed flanges 24 which are in spaced relation as shown in Figure 3 while adjacent to the other ends the side walls 22 are connected by the transverse bar 26 which is spaced inwardly from the adjacent ends of the walls to form the end recess 28. The bar 26 is provided with the usual downwardly extending lug 29 which has a threaded passage 30 therethrough for the reception of the screw member, not shown, by means of which the shoe is secured in operative position and at the other end, which will be referred to as the forward or leading end of the shoe, the flanges are under cut as indicated at 31, in the usual manner to facilitate mounting the shoe in working position.

The forward or leading end of the shoe is provided with a transverse screw passage 32 which, as shown in Figure 3, has the upper half opening through the top of the flanges 24 for engagement in the hereinafter described carbon insert.

The inner faces of the side walls 22 of the holder are each provided with an inwardly projecting flange 33 which runs the full length of the wall, for the purpose about to be described.

The carbon insert of the present invention is generally designated 34 and comprises the long solid carbon or carbon composition block 35 which at one end has the downwardly projecting lip 36 which extends across the width of the block, while at the other end the bottom face has formed transversely therein the semi-circular channel 37 which, when the carbon block is in position in the shoe, coincides with the portion of the screw passage 32 which opens through the tops of the flanges 24. Thus when the carbon block is inserted in position it is introduced at the end of the holder or shoe across which the bar 26 extends, the block being of the proper height to fit between the top of the bar and the flanges 33. When the carbon insert is introduced as described so as to have the flanges 33 engage over the top of the insert at the two longitudinal edges, the lip 36 will position in the recess 28 and the other end of the insert will come to position where the transverse channel 37 coincides with the screw thread passage 32 so that when the securing screw 39 is extended across between the side walls of the shoe a portion of the screw will lie in the channel 37 and the two ends of the walls will be drawn together thus securely binding the carbon insert in place.

Each end of the carbon insert has cut thereinto the upwardly opening recess 40. These recesses also open through the ends of the carbon block so that each has two side and inner end walls and a bottom wall. The top surface of the carbon block between the end recesses 40 is provided with the channel 42 in which the trolley wire slides and as shown in Figure 2. This channel is spaced at each side from the inner faces of the walls 22 of the holder or shoe so that the wire will not contact such walls.

In the use of the present improved carbon insert and holder or shoe the end having the lip 36 would be positioned to form the trailing end of the device as the lip extension protects the end of the holder or the bar 26 which connects the side walls thereof. However, the principal protection is provided by the recesses 40 since any sparking which occurs at the ends of the channel 42 will be confined to these recesses instead of burning the ends of the holder or shoe as is the case in the present devices.

It is to be understood that the foregoing description is not intended to restrict the scope of the invention and that various rearrangements of the parts and modifications of the design may be resorted to, giving effect to a liberal interpretation to the claim as herein set forth.

I claim:

In a trolley pole head, a slide shoe comprising two elongated, transversely spaced, parallel walls, a transverse bar connecting the lower edges of said walls inwardly of one of the ends thereof, a threaded apertured lug depending from the lower side of said bar for the securement of the body to the pole head, flanges extending lengthwise longitudinally along the inner sides of said walls below and parallel to the top edges of the same, a pair of transverse flanges extending inwardly toward each other in spaced end-to-end relation from the opposite ends of the lower edges of said walls, the top sides of the latter flanges having aligned longitudinally extending semi-circular recesses to seat a headed clamp bolt therein, a carbon insert having a length equal to that of said walls slidable inwardly of the body beneath the first flanges, and a lip depending from the trailing end of said insert and engaged in the space between said walls at the outer side of said bar against which it abuts, the bottom of the leading end of said insert having a transverse semi-circular recess adapted to register with the first semi-circular recesses for the engagement therein of the upper side of said clamp bolt which, when tightened, acts to draw said walls into substantial clamping engagement with the opposite sides of the insert, the ends of said insert being outwardly and upwardly recessed and between these recesses the top of the insert is longitudinally channeled for sliding engagement with the feeder wire.

References Cited in the file of this patent

UNITED STATES PATENTS

| 1,884,456 | Wilkins | Oct. 25, 1932 |
| 1,951,459 | Wilkins | Mar. 20, 1934 |
| 2,185,257 | Larsson | Jan. 2, 1940 |
| 2,342,296 | Palmer | Feb. 22, 1944 |

FOREIGN PATENTS

| 213,537 | Switzerland | May 16, 1941 |